US007874336B2

(12) United States Patent
Fadiga

(10) Patent No.: US 7,874,336 B2
(45) Date of Patent: Jan. 25, 2011

(54) LABEL APPLICATION ASSEMBLY COMPRISING SAFETY MEANS

(75) Inventor: Riccardo Fadiga, Marcallo Con Casone (IT)

(73) Assignee: Arca Etichette S.p.A., Marcallo Con Casone (IT)

( * ) Notice: Subject to any disclaimer, the term of this patent is extended or adjusted under 35 U.S.C. 154(b) by 569 days.

(21) Appl. No.: 11/887,962

(22) PCT Filed: Mar. 10, 2006

(86) PCT No.: PCT/EP2006/002244

§ 371 (c)(1),
(2), (4) Date: Oct. 5, 2007

(87) PCT Pub. No.: WO2006/108477

PCT Pub. Date: Oct. 19, 2006

(65) Prior Publication Data

US 2009/0050273 A1 Feb. 26, 2009

(30) Foreign Application Priority Data

Apr. 12, 2005 (IT) .......................... MI2005A0624

(51) Int. Cl.

| | |
|---|---|
| ***B30B 15/06*** | (2006.01) |
| ***B29C 65/56*** | (2006.01) |
| ***B32B 37/12*** | (2006.01) |
| *B30B 15/14* | (2006.01) |
| *B30B 15/30* | (2006.01) |

(52) U.S. Cl. ........................ 156/365; 156/538; 156/539

(58) Field of Classification Search ................ 156/365, 156/538, 539, 583.8, DIG. 44
See application file for complete search history.

(56) References Cited

U.S. PATENT DOCUMENTS

| | | | | |
|---|---|---|---|---|
| 3,721,352 | A | 3/1973 | Messmer | |
| 5,817,210 | A * | 10/1998 | Morin | 156/583.9 |
| 6,998,006 | B1 * | 2/2006 | Kessler et al. | 156/230 |
| 7,185,689 | B2 * | 3/2007 | Jenkins et al. | 156/540 |
| 7,387,698 | B2 * | 6/2008 | Hoogland | 156/196 |
| 2006/0185796 | A1 * | 8/2006 | Hayasaka et al. | 156/361 |
| 2007/0095482 | A1 * | 5/2007 | Benton | 156/539 |

FOREIGN PATENT DOCUMENTS

| | | | |
|---|---|---|---|
| DE | 199 06 116 | A1 | 8/2000 |
| DE | 19906116 | A1 * | 8/2000 |
| EP | 1407970 | A1 * | 4/2004 |

* cited by examiner

*Primary Examiner*—Philip C Tucker
*Assistant Examiner*—Sonya Mazumdar
(74) *Attorney, Agent, or Firm*—Modiano & Associati; Albert Josif; Daniel J. O'Byrne

(57) ABSTRACT

A label application assembly for labeling machines in general, comprising, downstream of a label feeder, a plate for picking up the labels, which is connected to means for transfer onto the product to be labeled, safety means being provided which are interposed between the pick-up plate and the transfer means and are adapted to intervene when the pick-up plate interacts with obstacles interposed in the region where the pick-up plate moves.

8 Claims, 4 Drawing Sheets

LABEL APPLICATION ASSEMBLY COMPRISING SAFETY MEANS

This application is a National Stage of International Application No. PCT/EP2006/002244, filed Mar. 10, 2006, which claims the benefit of Italy Patent Application No. MI2005A000624, filed Apr. 12, 2005.

TECHNICAL FIELD

The present invention relates to a label application assembly for labeling machines in general.

BACKGROUND ART

As is known, labeling machines arranged in-line in order to position labels on packages traveling along a conveyance line typically use a label application assembly designed to pick up the labels from the feeder and apply them by means of a plate onto the product to be labeled.

The label pick-up plate can move along a straight path, if the label is applied on top of the product, or can optionally move with a tilting motion if the label is applied to the front or rear wall of the product.

In all the embodiments, it is necessary to provide safety criteria which prevent injuries which can be caused mainly from crushing, if the hand of the operator remains interposed between the pick-up plate and the product, and shearing, if the hand of the user remains interposed between the edge of the feeder and the upper part of the pick-up plate.

Whereas for safety against crushing the safety means are relatively simple to provide, with a reduction of the pressure applied by the actuator, the solution to the problem of shearing between the plate and the edge of the feeder has proved to be much more complicated, and therefore movable enclosures are used which, besides causing hindrance also during work, have an additional mass which must be moved, with all the associated problems; alternatively, the entire machine is enclosed, with consequent high costs and inconvenience during operation.

DISCLOSURE OF THE INVENTION

The aim of the invention is to solve the problem described above by providing a label application assembly for labeling machines in general which allows to solve the problem of shearing without having to resort to enclosures which constitute a hindrance also for normal work.

Within this aim, an object of the invention is to provide an application assembly that allows to provide the intervention of the safety means very easily, thus constituting an additional protection element.

Another object of the present invention is to provide an application assembly which, thanks to its particular constructive characteristics, is capable of giving the greatest assurances of reliability and safety in use.

Another object of the present invention is to provide a label application assembly for labeling machines in general which can be obtained easily starting from commonly commercially available elements and materials and is further competitive from a merely economical standpoint.

This aim and these and other objects, which will become better apparent hereinafter, are achieved by a label application assembly for labeling machines in general, according to the invention, comprising, downstream of a label feeder, a plate for picking up the labels, which is connected to means for transfer onto the product to be labeled, characterized in that it comprises safety means, which are interposed between said pick-up plate and said transfer means and are adapted to intervene when said pick-up plate interacts with obstacles interposed in the region where said plate moves.

BRIEF DESCRIPTION OF THE DRAWINGS

Further characteristics and advantages of the present invention will become better apparent from the description of a preferred but not exclusive embodiment of a label application assembly for labeling machines in general, illustrated by way of non-limiting example in the accompanying drawings, wherein.

WAYS OF CARRYING OUT THE INVENTION

Figure 1:
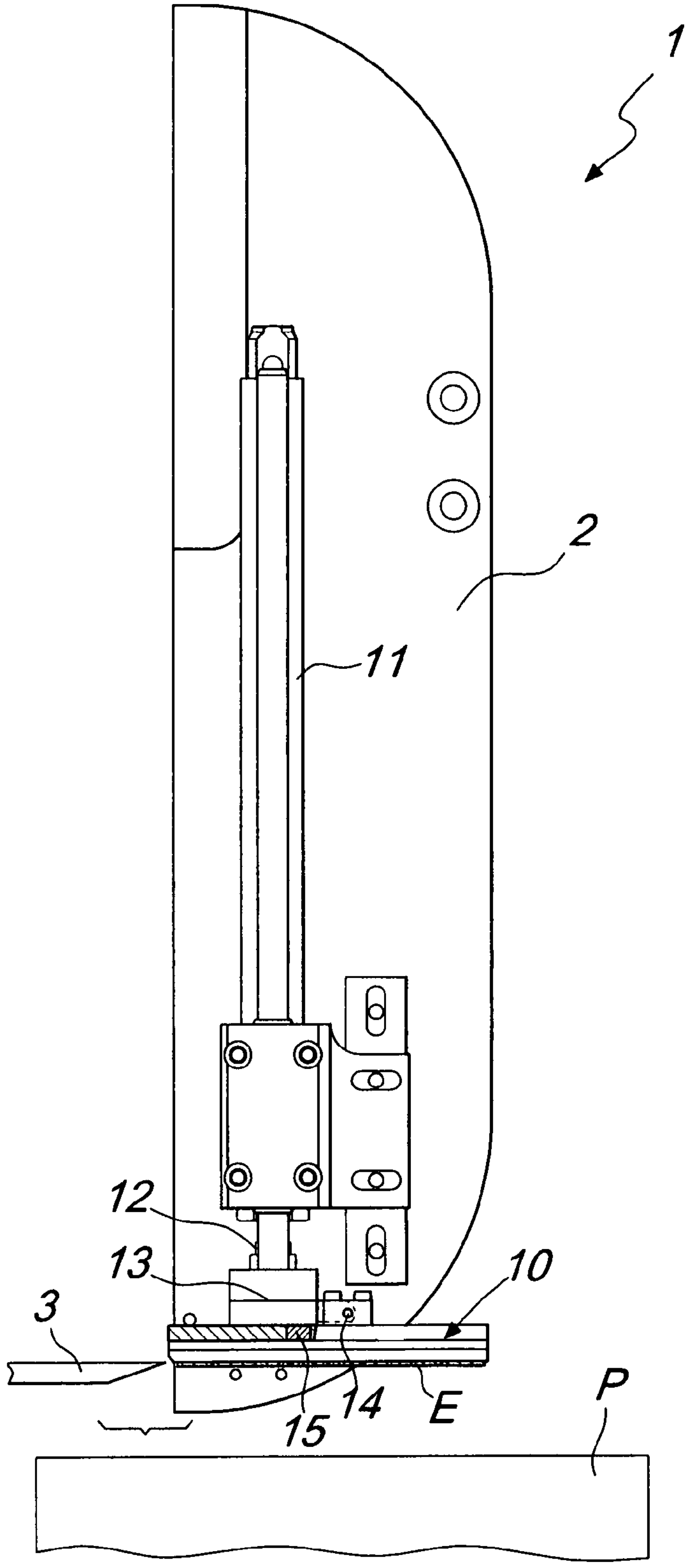
FIG. 1 is a schematic view of the label application assembly, with the pick-up plate having a linear motion.
Figure 2:
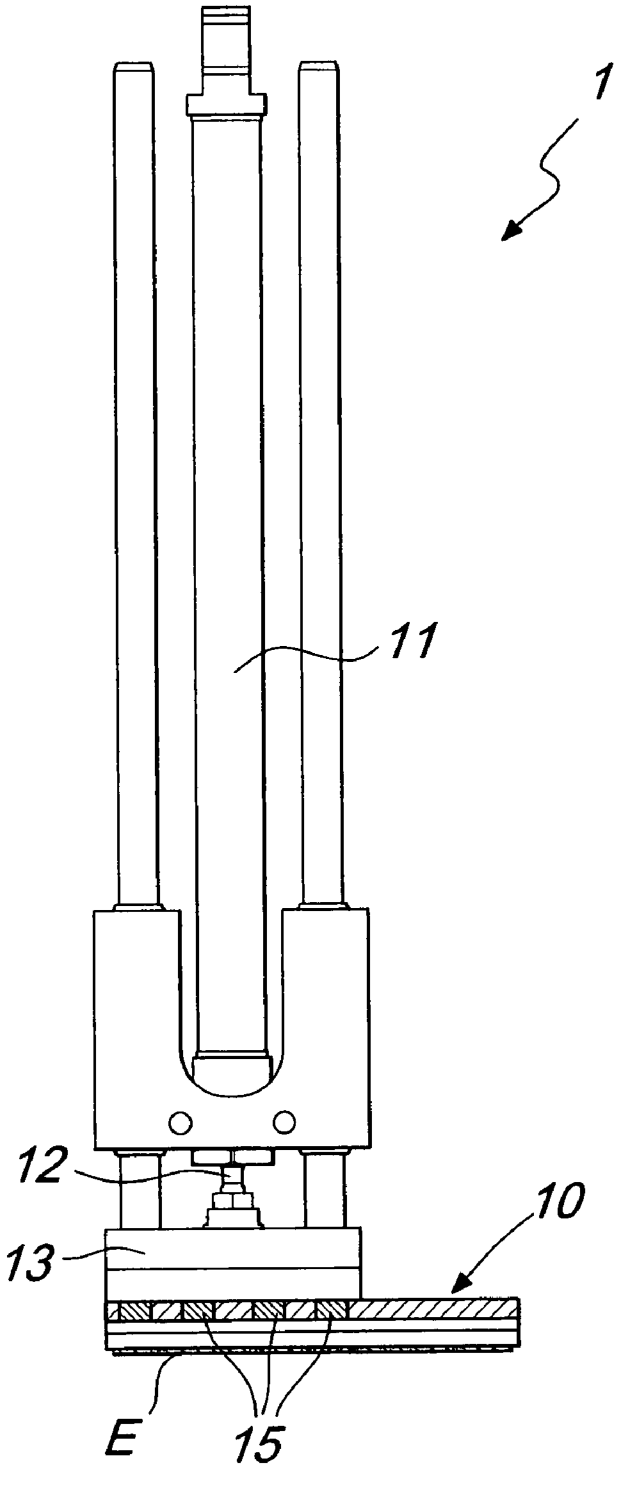
FIG. 2 is a front view of the application assembly of FIG. 1.
Figure 3:
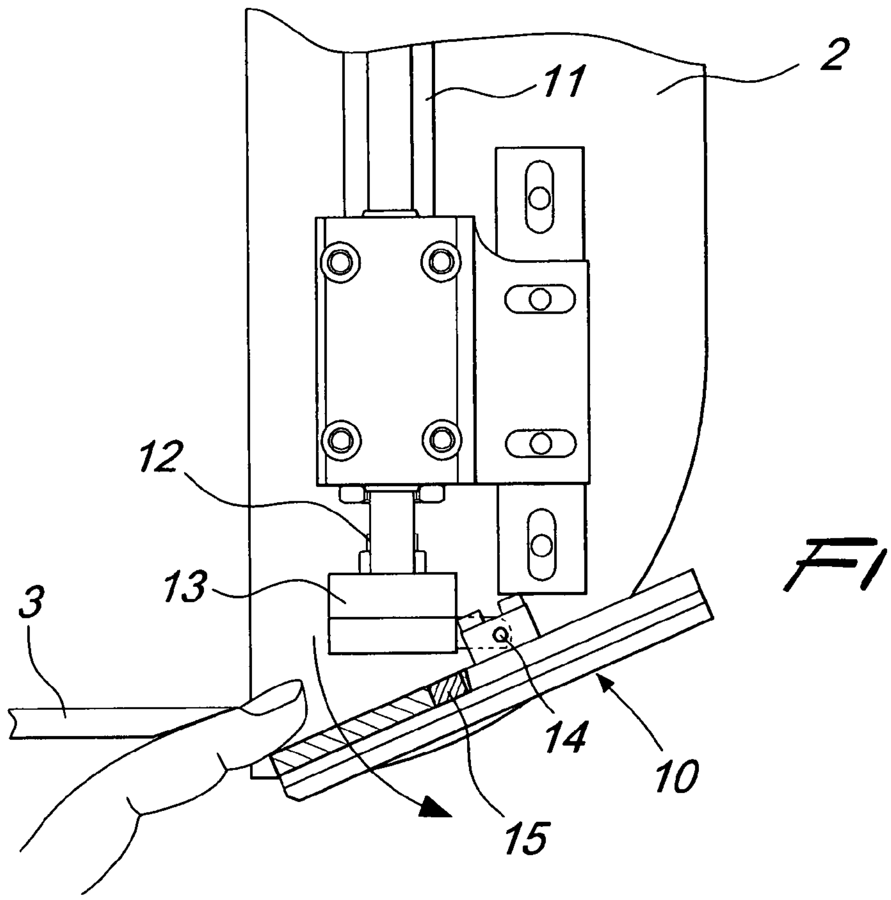
FIG. 3 is a view of the step of the intervention of the shearing prevention safety means.

With reference to the figures, and in particular to FIGS. 1 to 3, the label application assembly for labeling machines in general, generally designated by the reference numeral 1, comprises a supporting frame 2, which is arranged downstream of a label feeder, generally designated by the reference numeral 3.

Downstream of the label feeder 3, which can be of the type which prints the label directly, a pick-up plate 10 is provided which is connected to means for transfer of the label onto the product to be labeled.

In FIGS. 1 to 3, said transfer means are of the type with linear motion and substantially have an actuator or cylinder 11, inside which a stem 12 can slide which supports the pick-up plate 10.

A particular characteristic of the invention consists in that between the pick-up plate 10 and the transfer means 11 there are safety means, which intervene when the pick-up plate interacts with obstacles interposed in the region of movement of plate 10.

In order to solve the problem of shearing with the edge of the feeder 3, at the lower end of the stem 12 a block 13 is provided which connects the pick-up plate 10 by means of a hinge 14.

In order to ensure the correct positioning of the pick-up plate, during normal work there are retention means which, in a preferred but not exclusive embodiment, are provided by means of permanent magnets 15, which are accommodated in the plate and, by adhering to the block 13 made of ferromagnetic material, keep the plate in position, though allowing it to tilt if an obstacle, for example a finger, is interposed between the feeder 3 and said plate.

The presence of an obstacle overcomes, during the upward stroke of the plate 10, the magnetic adhesion force provided by means of the permanent magnets 15, consequently tilting the plate 10, which by rotating about the hinge 14 in practice opens the region at the edge of the feeder, preventing harmful shearing.

The pivoting is such that if the safety means intervene, the pick-up plate 10 can rotate freely in the direction away from the feeder 3.

It is optionally possible to provide means for automatically restoring the position of the plate 10, which can be constituted for example by a return spring arranged on the hinge or optionally by a counterweighting of the plate with respect to the hinge 14 which returns the plate into position; it is also possible to stop the machine, thereby requiring a manual reset of the operating conditions.

Figure 5:
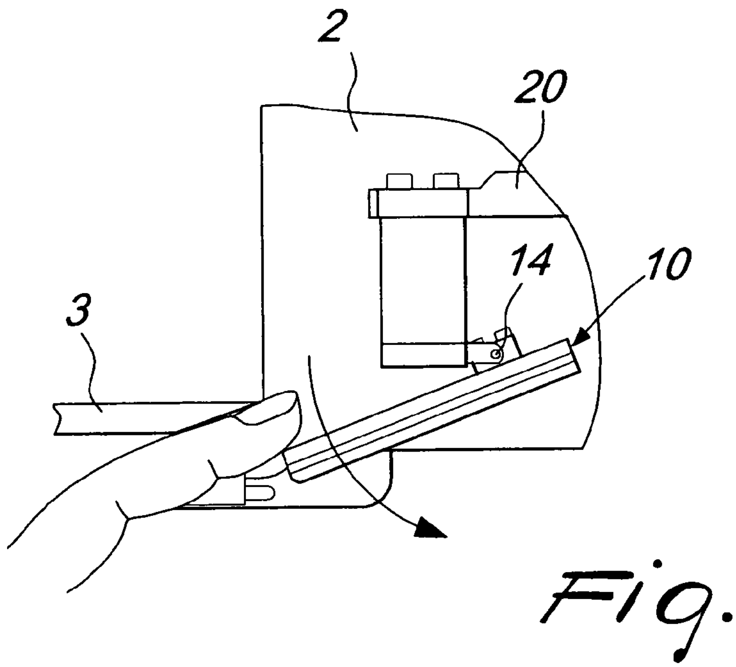
FIG. 5 is a schematic detailed partial view of the intervention of the safety means.
Figure 4:
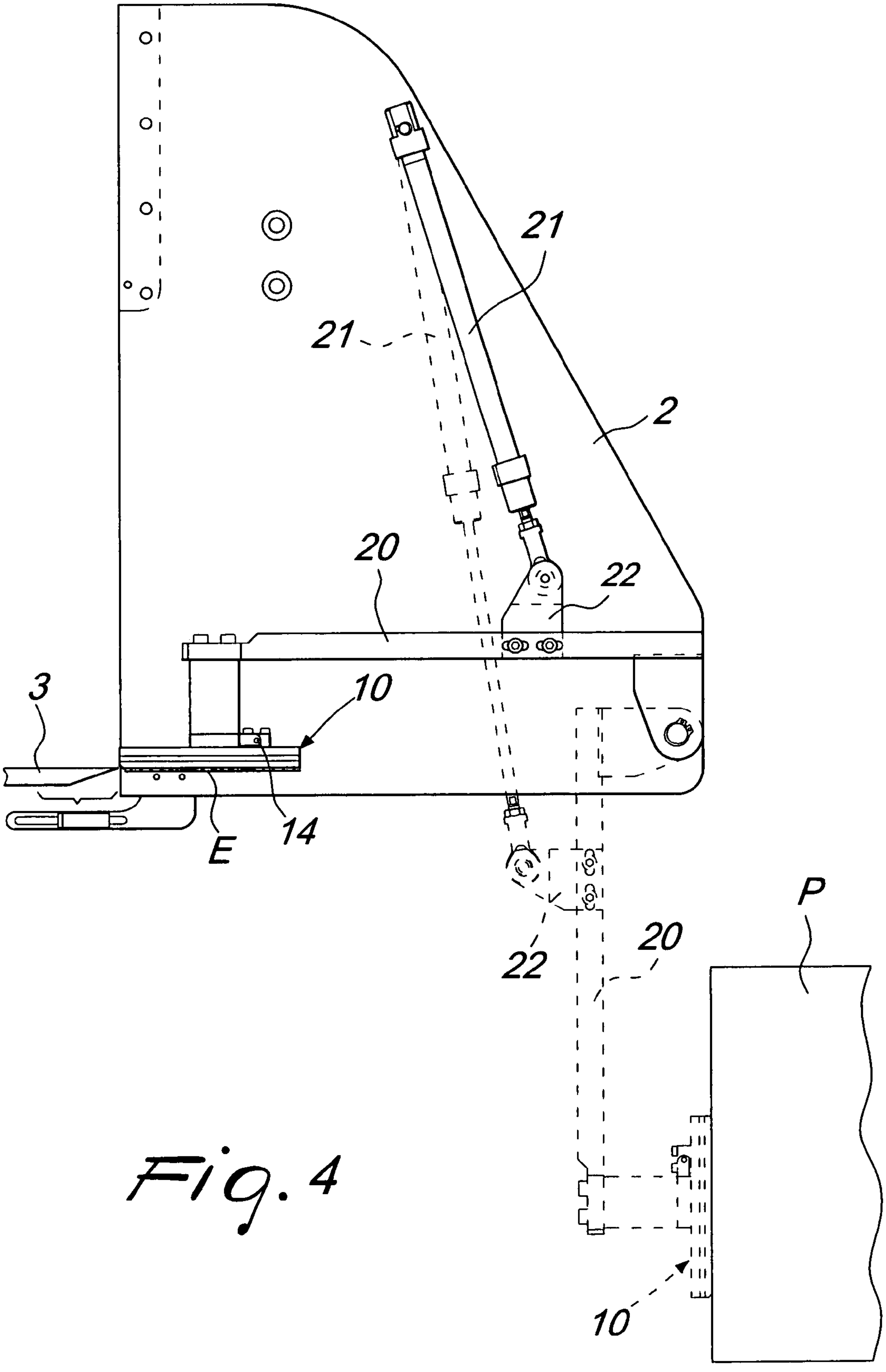
FIG. 4 is a schematic view of a label application assembly with the pick-up plate which can turn in order to position the labels on the lateral face of the product.

According to what is illustrated in FIGS. 4 to 5, a different practical embodiment is described which refers to the case of transfer means which turn the plate supported by a supporting arm 20, which is pivoted to the frame, again designated by the reference numeral 2, and is actuated by a cylinder 21 of the pneumatic type or of another type, which is pivoted between the frame 2 and has its stem pivoted to a bracket 22 connected to the arm 20.

In this embodiment, therefore, the actuation of the cylinder 21 tilts the plate that carries the label, designated by the reference letter E, from the region at the output of the feeder, until it is arranged on the product, which is designated by the reference letter P.

The plate, again designated by the reference numeral 10, is connected to a supporting block 13, which is supported at the end of the arm 20, and is pivoted in a manner that is fully similar to what has been described above.

It should be added to the above that depending on the different requirements of the application, it is possible to replace the pick-up plate 10 with plates having different dimensions, without altering the concept that the plate is arranged so that it is pivoted with respect to the corresponding supporting block with removable retention means advantageously constituted by the permanent magnets, which allow to have considerable positioning stability during normal work but at the same time allow free oscillation of the pick-up plate if it is in the presence of an obstacle, since the attraction force applied by the permanent magnets can be overcome easily, and therefore a spacing is provided which prevents the possibility of shearing.

From what has been described above, it is therefore evident that the invention achieves the proposed aim and objects and in particular the fact is stressed that shearing prevention safety means are provided which are particularly effective though being structurally very simple.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2005A000624 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A label application assembly for labeling machines, comprising, downstream of a label feeder, a pick-up plate for picking up labels, which is connected to transfer means for transfer onto a product to be labeled, comprising safety means, which are interposed between said pick-up plate and said transfer means and are adapted to intervene when said pick-up plate interacts with obstacles interposed in a region where said pick-up plate moves, said safety means providing shearing prevention means, and said shearing prevention means comprising a hinge for the connection of said pick-up plate to a block which is associated with said transfer means, retention means being further provided for retaining in position said pick-up plate, said retention means being adapted to act when a preset stress is exceeded.

2. The application assembly according to claim 1, wherein said retention means are constituted by permanent magnets.

3. The application assembly according to claim 2, wherein said permanent magnets are accommodated in said pick-up plate and adhere against said block made of ferromagnetic material.

4. The application assembly according to claim 1, further comprising restoring means for restoring the position of said pick-up plate.

5. The application assembly according to claim 4, wherein said restoring means are constituted by a return spring which acts at said hinge.

6. A label application assembly for labeling machines, comprising, downstream of a label feeder, a pick-up plate for picking up labels, which is connected to transfer means for transfer onto a product to be labeled, comprising safety means, which are interposed between said pick-up plate and said transfer means and are adapted to intervene when said pick-up plate interacts with obstacles interposed in a region where said pick-up plate moves, the label application assembly further comprising restoring means for restoring the position of said pick-up plate, said restoring means comprising a counterweighing of said plate with respect to said hinge.

7. The application assembly according to claim 1, wherein said transfer means have a cylinder with linear motion.

8. The application assembly according to claim 1, wherein said transfer means comprise a supporting arm which rotates with respect to one of ends thereof, a cylinder being further provided which acts between said supporting arm and a supporting frame of said supporting arm.

* * * * *